United States Patent
Epstein et al.

(10) Patent No.: US 8,498,886 B2
(45) Date of Patent: Jul. 30, 2013

(54) METHOD AND SYSTEM FOR CREATING AN ELECTRIC VEHICLE CHARGING NETWORK

(75) Inventors: Michael L. Epstein, Bedminster, NJ (US); Christopher K. Dyer, Madison, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 25 days.

(21) Appl. No.: 13/541,913

(22) Filed: Jul. 5, 2012

(65) Prior Publication Data

US 2013/0046513 A1   Feb. 21, 2013

Related U.S. Application Data

(63) Continuation of application No. 13/237,231, filed on Dec. 15, 2011.

(60) Provisional application No. 61/524,501, filed on Aug. 17, 2011, provisional application No. 61/559,927, filed on Nov. 15, 2011.

(51) Int. Cl.
*G06Q 10/00*   (2012.01)

(52) U.S. Cl.
USPC ............................................... 705/5

(58) Field of Classification Search
USPC ............................................... 705/5
See application file for complete search history.

(56) References Cited

U.S. PATENT DOCUMENTS

| | | |
|---|---|---|
| 2008/0040263 A1 | 2/2008 | Pollack et al. |
| 2008/0228613 A1* | 9/2008 | Alexander ............... 705/35 |
| 2010/0049572 A1 | 2/2010 | Berman |
| 2010/0211643 A1 | 8/2010 | Lowenthal |
| 2010/0241560 A1* | 9/2010 | Landau-Holdsworth et al. ............... 705/39 |
| 2011/0191186 A1 | 8/2011 | Levy et al. |
| 2011/0191265 A1 | 8/2011 | Lowenthal et al. |
| 2012/0086396 A1 | 4/2012 | Pan et al. |
| 2012/0089329 A1 | 4/2012 | Kim et al. |
| 2012/0173292 A1 | 7/2012 | Solomon et al. |
| 2012/0191242 A1 | 7/2012 | Outwater |

* cited by examiner

*Primary Examiner* — Gor Borissov
*Assistant Examiner* — David J Clark
(74) *Attorney, Agent, or Firm* — Davidson, Davidson & Kappel, LLC

(57) ABSTRACT

A method for creating an electric vehicle charging network includes receiving first location data from a first remote device; providing electric vehicle charger data to the first remote device as a function of the first location data; receiving second location data from a second remote device; providing the electric vehicle charger data to the second remote device as a function of the second location data; and, in response to the electric vehicle charger data, receiving interest data from the first and second remote devices to permit creation of a first electric vehicle charger. Further methods and systems are provided.

19 Claims, 10 Drawing Sheets

| Recharger at the Corner of 44 & 299 | |
|---|---|
| ID# : | 725 /―22 |
| Plug Type : | CHAdeMO /―24 |
| Location : | Parking Lot /―26<br>Mountain Brauhaus<br>123 Route 44<br>New Paltz 12561 |
| Brand : | ABB Terra 51 Charge Station /―28 |
| # Participants : | 6 /―30 |
| Cost/Participant : | $1500.00 /―32 |
| Current Participants : | abc 123 /―34 |
| | [ Participate ] /―36 |

| Recharger at the Corner of 32 & 299 | |
|---|---|
| ID# : | 663 ⬅ 222 |
| Type : | SAE J1772 ⬅ 224 |
| Location : | Texaco ⬅ 226<br>536 Main St.<br>New Paltz 12561 |
| Brand : | Bosch ⬅ 228 |
| # Participants : | 6 ⬅ 230 |
| Cost/Participant : | $1200.00 ⬅ 232 |
| Current Participants : | xyz 123 ⬅ 234<br>ddk 100<br>joey 7 |
| | [ Participate ] ⬅ 236 |

FIG. 4

Participate in 663

Contract Details — 238

| | 12AM | 3AM | 6AM | 9AM | NOON | 3PM | 6PM | 9PM | 12PM |
|---|---|---|---|---|---|---|---|---|---|
| Mon | | | | xyz 123 | | | | Joey 7 | |
| Tues | | | | xyz 123 | | | | Joey 7 | |
| Wed | | | | xyz 123 | | | | Joey 7 | |
| Thu | | | | xyz 123 | | | | Joey 7 | |
| Fr | | | | xyz 123 | | | | Joey 7 | |
| Sa | | | | | ddk100 | | | | |
| Su | | | | | ddk100 | | | | |

240

Reserved Times — 242

Credit Card Information

Enter Payment [ ]

Contact Website Operator — 244

Contact Participant — 246

| xyz 123 |
| ddk100 |
| joey 7 |

FIG. 5

Recharger at the Corner of 87 & 299

Lighten ID# : 212 ←─322

Type : TBD ←─324

Location : Town New Paltz Parking Lot ←─326
Corner Main St. /87 Exit
New Paltz 12561

Brand : TBD ←─328

Participants : TBD ←─330

Cost/Participant : est Total Cost $8000 ←─332

Interested : xzy 222 ←─334
john 637

| Express Interest | ←─336
| Become Founder | ←─338

FIG. 6

Recharger ID# : 212 xzy 222 Interest

Type : SAE J1772 ← 424

Brand : any ← 428

Times : ← 440

| | 12AM | 3AM | 6AM | 9AM | NOON | 3PM | 6PM | 9PM | 12PM |
|---|---|---|---|---|---|---|---|---|---|
| Mon | | | | | | X | | | |
| Tues | | | | | | X | | | |
| Wed | | | | | | X | | | |
| Thu | | | | | | X | | | |
| Fr | | | | | | X | | | |
| Sa | | | | | | | | | |
| Su | | | | | | | | | |

Contact ← 446

METHOD AND SYSTEM FOR CREATING AN ELECTRIC VEHICLE CHARGING NETWORK

This is a continuation of U.S. patent application Ser. No. 13/327,231, filed Dec. 15, 2011 and claims the benefit thereof and also of U.S. Provisional Patent Applications 61/524,501 and 61/559,927, filed on Aug. 17, 2011 and Nov. 15, 2011 respectively, all of which are hereby incorporated by reference herein.

BACKGROUND

Electric vehicle (EV) recharging networks have begun to be established in various parts of the world. For example, Tesla Motors has developed a fast DC recharger network in California.

Typical chargers for electric vehicles, including hybrid electric vehicles, include Level 1, Level II and fast DC rechargers, which typically will use either a CHAdeMo or SAE J1772 standard.

SUMMARY OF THE INVENTION

However, even faster rechargers are envisioned, including battery-swapping stations. The cost of these future stations as well as fast DC rechargers and even lower level rechargers may be expensive for various reasons, including location or real estate costs.

In addition, the logistics of creating and operating an EV charging network that meets the needs of a certain EV owner community is difficult, and creating such a network from the "top down" is, in the view of the present inventors, difficult.

The present invention envisions creating an electric vehicle charging network from the "bottom up" and provides a system and method for creating such a network.

The present invention provides a method for creating an electric vehicle charging network comprising:
  receiving first location data from a first remote device;
  providing electric vehicle charger data to the first remote device as a function of the first location data;
  receiving second location data from a second remote device;
  providing the electric vehicle charger data to the second remote device as a function of the second location data; and
  in response to the electric vehicle charger data, receiving interest data from the first and second remote devices to permit creation of a first electric vehicle charger.

The present invention also provides a method for creating an electric vehicle charging network comprising:
  receiving first location data from a first remote device;
  providing possible location data for a first electric vehicle charger as a function of the first location data;
  receiving first interest data from the first remote device in the first electric vehicle charger; and
  providing the first interest data to a second remote device to generate further interest data in the first electric vehicle charger.

The present invention also provides a method for creating an electric vehicle charging network comprising:
  receiving first location data from a first remote device;
  providing electric vehicle charger data to the first remote device as a function of the first location data;
  in response to the electric vehicle charger data, receiving data from the first remote device indicating interest in creating a first electric vehicle charger so as to define first interest data;
  providing the first interest data to a second remote device; and
  in response to the first interest data, receiving second location data including actual location data for a first electric vehicle charger.

The present invention also provides a computerized system for creating an electric vehicle charging network comprising:
  a server;
  a plurality of remote devices capable of communicating with the server, including a first remote device and a second remote device;
  the server including first location data from the first remote device, electric vehicle charger data, second location data from the second remote device, interest data from the first and second remote devices, and first electric vehicle charger data, the first electric vehicle charger data being a function of the interest data.

The present invention also provides a computerized system for creating an electric vehicle charging network comprising:
  a server;
  a plurality of remote devices capable of communicating with the server, including a first remote device and a second remote device;
  the server including first location data from the first remote device, possible location data for a first electric vehicle charger as a function of the first location data, first interest data from the first remote device in the first electric vehicle charger, and further interest data from the second remote device in the first electric vehicle charger.

The present invention also provides a computerized system for creating an electric vehicle charging network comprising:
  a server;
  a plurality of remote devices capable of communicating with the server, including a first remote device and a second remote device;
  the server including first location data from the first remote device, first interest data from the first remote device, second location data from the second remote device as a function of the first interest data, the second location data including actual location data for a first electric vehicle charger.

BRIEF DESCRIPTION OF THE DRAWINGS

One embodiment of the method and system of the present invention may be further described using the following drawings, in which:

FIG. 3 shows the first GUI of the first remote device with data concerning possible recharging station 104 of FIG. 2;

FIG. 4 shows the first GUI of the first remote device with data concerning possible recharging station 106 of FIG. 2;

FIG. 5 shows the first GUI of the first remote device with a web page permitting input of data concerning possible participation in creating recharging station 106 of FIG. 2;

FIG. 6 shows a second GUI of a second remote device with data concerning the possible recharging station 120 of FIG. 2;

FIG. 7 shows the second GUI of the second remote device with a web page permitting input of data concerning possible participation in creating recharging station 120 of FIG. 2;

DETAILED DESCRIPTION OF THE PREFERRED EMBODIMENT

Figure 1:
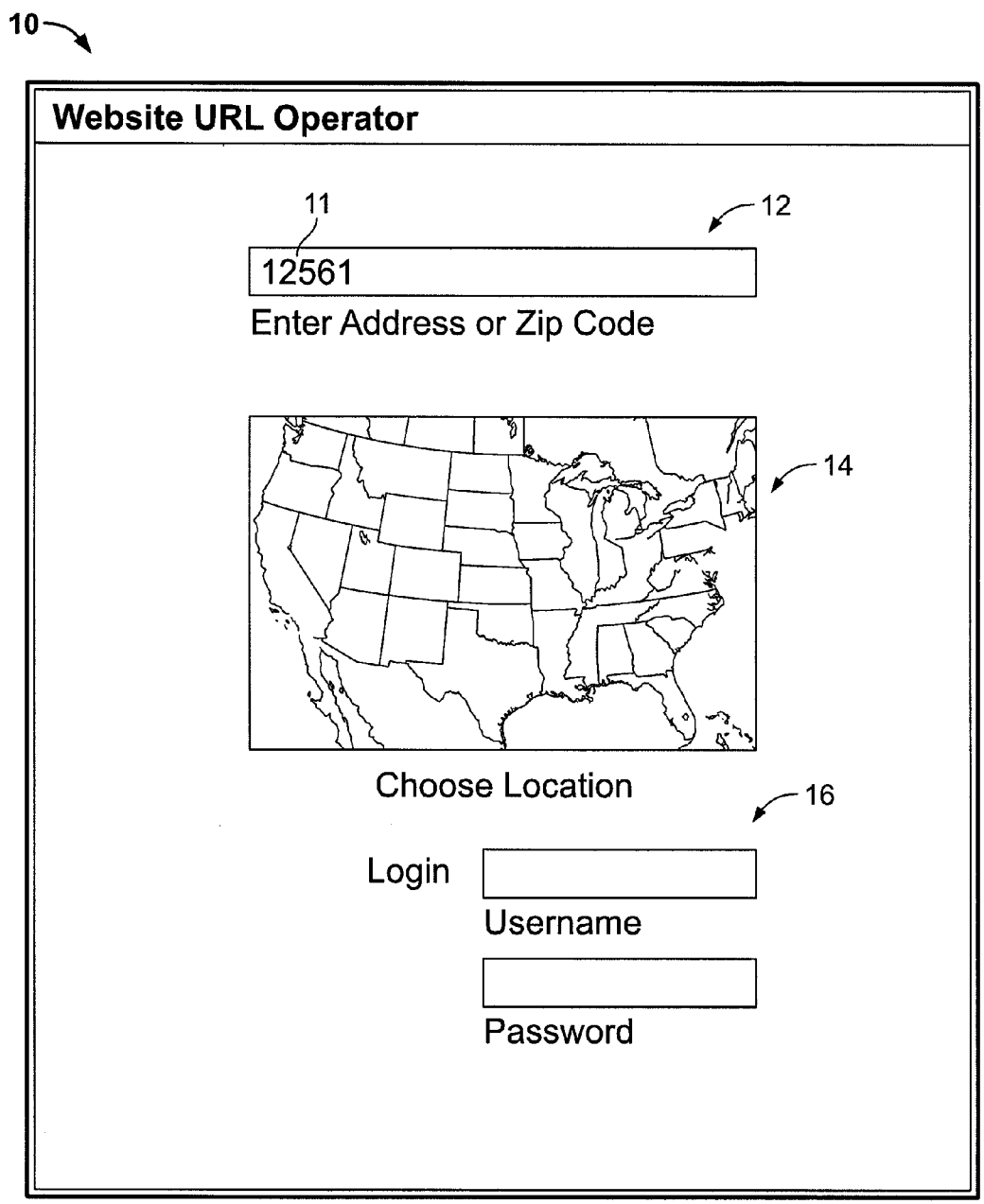
FIG. 1 shows a first GUI of a first remote device with a web page for receiving first location data.

FIG. 1 shows a first graphical user interface (GUI) of a first remote device with a web page 10 for receiving first location data 11. The first remote device may be any device capable of interacting as a client with a server, for example a home computer, cell phone with web capabilities, or tablet, connected for example via a TCP/IP protocol to a server. The first remote device may have voice capabilities as well for providing or receiving any of the information herein.

Web page 10 permits a user of the first remote device to enter first location data 11, for example via an address or zip code field 12, a map 14 permitting receipt of for example a mouse pointer information, or via a log-in field 16 where the users location information is already known, for example via a database.

Figure 2:
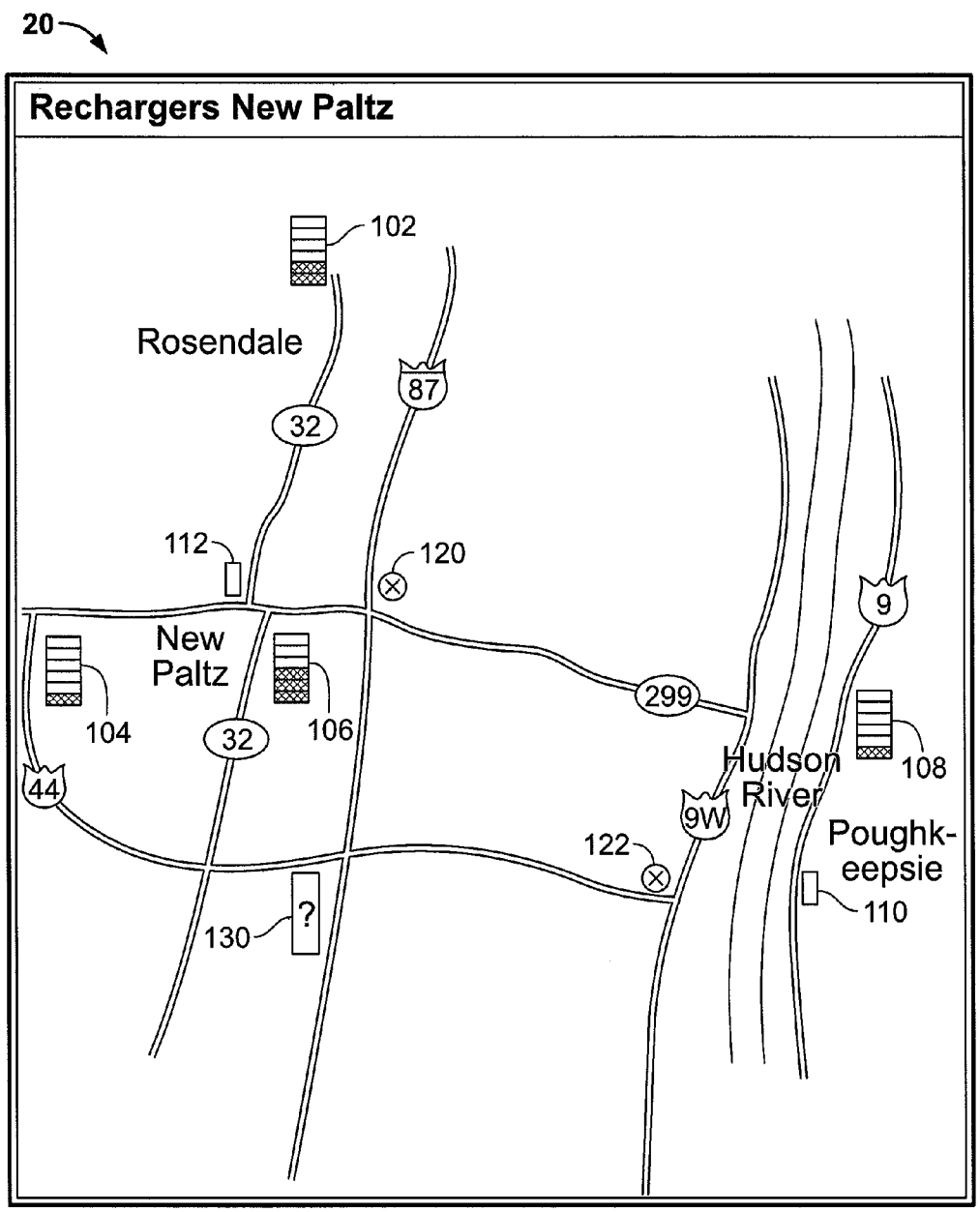
FIG. 2 shows the first GUI of the first remote device with a web page providing data on various existing and possible electric vehicle recharging stations.

The first location data 11, here a zip code, can be received at a server providing web page 10, and in response to the first location data 11 the server can provide data concerning an existing or envisioned network of electric vehicle rechargers via for example a web page 20, as shown in FIG. 2.

The data in FIG. 2 may include a map indicating for example completed electric vehicle rechargers 110, 112, possible electric vehicle rechargers 102, 104, 106, 108 with interest data including payment data and actual location data concerning the rechargers already received and stored by the server, possible electric vehicle rechargers 120, 122 with actual location data concerning the rechargers stored by the server, but no payment data yet received, and possible electric vehicle recharger 130 with interest data but not actual location data yet received.

FIG. 2 thus represents an overview of an existing and possible electric vehicle recharging network in which members of a social network or simply those accessing a website may be provided not only with information regarding existing electric vehicle rechargers 110, 112 in the network, but also in one embodiment on becoming participants in building up the network, for example by investing and providing payment data for shares in possible electric vehicle rechargers 102, 104, 106 and 108.

In yet further embodiments of the present invention the method and system of the present invention permit landowners and others to provide actual location data, for example so that possible electric rechargers 120, 122 are created, and in yet another embodiment for users simply to express certain partial interest in creating an electric vehicle charger 130 in a certain general location.

An entire vehicle charging network thus can be created from the bottom up based on actual needs and desires of the participants of the network.

The creation of the network will now be described in greater detail.

FIG. 3 shows the first GUI of the first remote device with data concerning possible recharging station 104 of FIG. 2. Upon for example, clicking by a user of the first remote device on the graphical representation of recharging station 104, current data on the possible recharging station 104 can be provided to the first remote device. The electric vehicle recharger data may include network ID data 22, plug or recharger type data 24, location data 26, brand data 28, participant number data 30, cost data 32, current participant data 34 and a participate button 36.

For this possible station 104, solely one participant has provided payment data, and if the system is so designed, access to the participant, for example via email contact may be provided. In a preferred embodiment, access to the participant is only provided if the user of the first remote device and the participant are members of a social network, for example the social network running the server.

FIG. 3 thus provides the first remote device with data including actual location data and participant data, the participant having already provided interest and payment data to the server. The user of the first remote device thus can be assured that submission of payment data by a certain number of participants, here a total of six participants, will result in creation of the electric vehicle recharging station. For example, the operator of the website will create all legal documents and purchasing and then forward legal conformation of the participation of the user in the electric recharging station 104. The legal form may vary from state to state or location to location, but may be for example a partnership, time-share, LLC, other contractual relationship or other legal form. In other embodiments, payment may be delayed until later for example after formation of the electric recharger.

The location, cost and other data may have been provided by a lead participant, by the network running the server, by the location owner, a third party or any combination.

FIG. 4 shows the first GUI of the first remote device with data 230 concerning possible recharging station 106 of FIG. 2. The electric vehicle recharger data 230 may include network ID data 222, plug or recharger type data 224, location data 226, brand data 228, participant number data 230, cost data 232, current participant data 234 and a participate button 236. Here, three participants xyz123, ddk100 and joey 7 have provided payment already.

Map 20 in FIG. 2 can be updated with visual clues expressing actual participants, for example six bars on location 106 can be shown, with three filled, and one more filled as a further participant joins.

FIG. 5 shows the first GUI of the first remote device with a web page which may result upon clicking of the participate button 236. This web page permits input of data concerning possible participation in creating recharging station 106 of FIG. 2, and also provides for example for the user to receive contract details, for example via a button 238. Any legal documents to be signed or already signed, including for example land lease information and the basis for the cost information may be provided. These details advantageously also may be solely available to members of the social network mentioned above.

Timetable 240 may provide information on desired or reserved charging times and permit the potential participant to reserve charging times. For example for station 106, depending on contract terms, each participant may be entitled to reserve 5 charging times, which could be for example for a length of 30 minutes. Here lengths of 3 hours are shown for clarity. Such reserving of times may encourage earlier participation.

Payment information can be received for example via input 242, and may be cleared for example by the server and operator of the server.

The server operator can also be contacted via input 244, and other participants via input 246 for example.

FIG. 6 shows a second GUI of a second remote device with data concerning the possible recharging station 120 of FIG. 2. The electric vehicle recharger data may include network ID data 322, plug or recharger type data 324, location data 326, brand data 328, participant number data 330, cost data 332, interested participant data 334, an express interest button 336 and a become founder button 338. Here, two participants xyz22 and john637 have expressed interest but not taken any further steps. No actual payment has been received. The server operator has provided ID data 322 and estimated cost data 332, based for example on similar locations in the area. A possible lessor has provided actual location data 326. However, the type of recharger, brand number of participants and total cost have not been decided.

In this embodiment, a potential participant could simply decide these fields a founder, by pressing button 338. The operator or further be pages could direct the participant to provide payment and take further steps. In fact, the participant could decide to be the sole owner and have data field for participant number 330 to have the value one. More likely, the potential participant will make a partial investment.

Alternately, the viewer of FIG. 6 could simply express interest via button 336 and be shown FIG. 7. Type interest via input 424, brand interest via input 428 and time interest via timetable 440 could be provided to enable the operator to collect interest information on possible station 120. Data can be sent via a submission or contact button 446.

Figure 8:
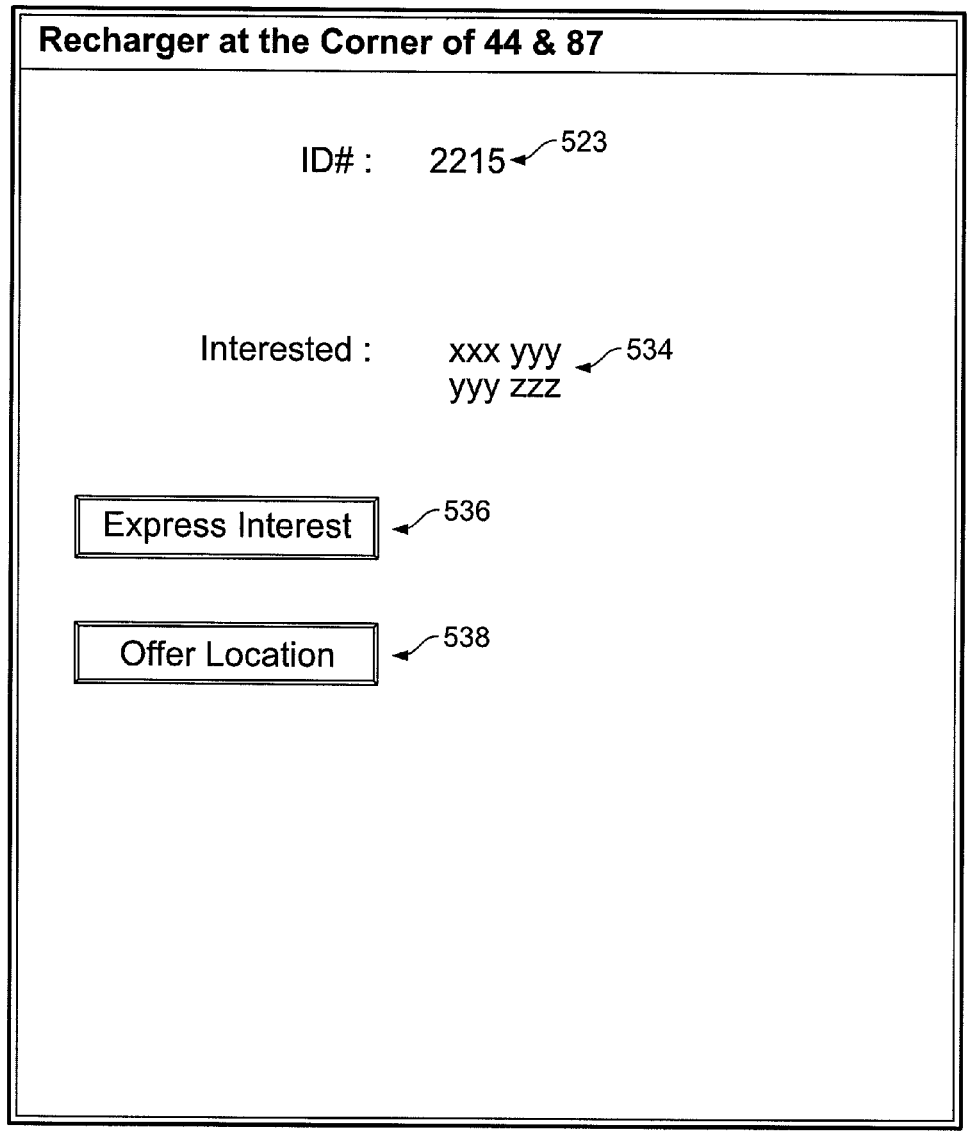
FIG. 8 shows a third GUI of a third remote device with data concerning the possible recharging station 130 of FIG. 2.

FIG. 8 shows a third GUI of a third remote device with data concerning the possible recharging station 130 of FIG. 2. Here interest in the general area has been expressed by 2 parties, shown in field 534. A first party xxxyyy had expressed interest in the general location, for example via clicking a pointer on map 20, and the website operator provided a graphical indicator with a question mark as possible recharger 130, and an ID 522. A second party yyyzzz expressed similar interest via a button 536 and provided some data, for example via a web page similar to that shown in FIG. 7.

Figure 9:
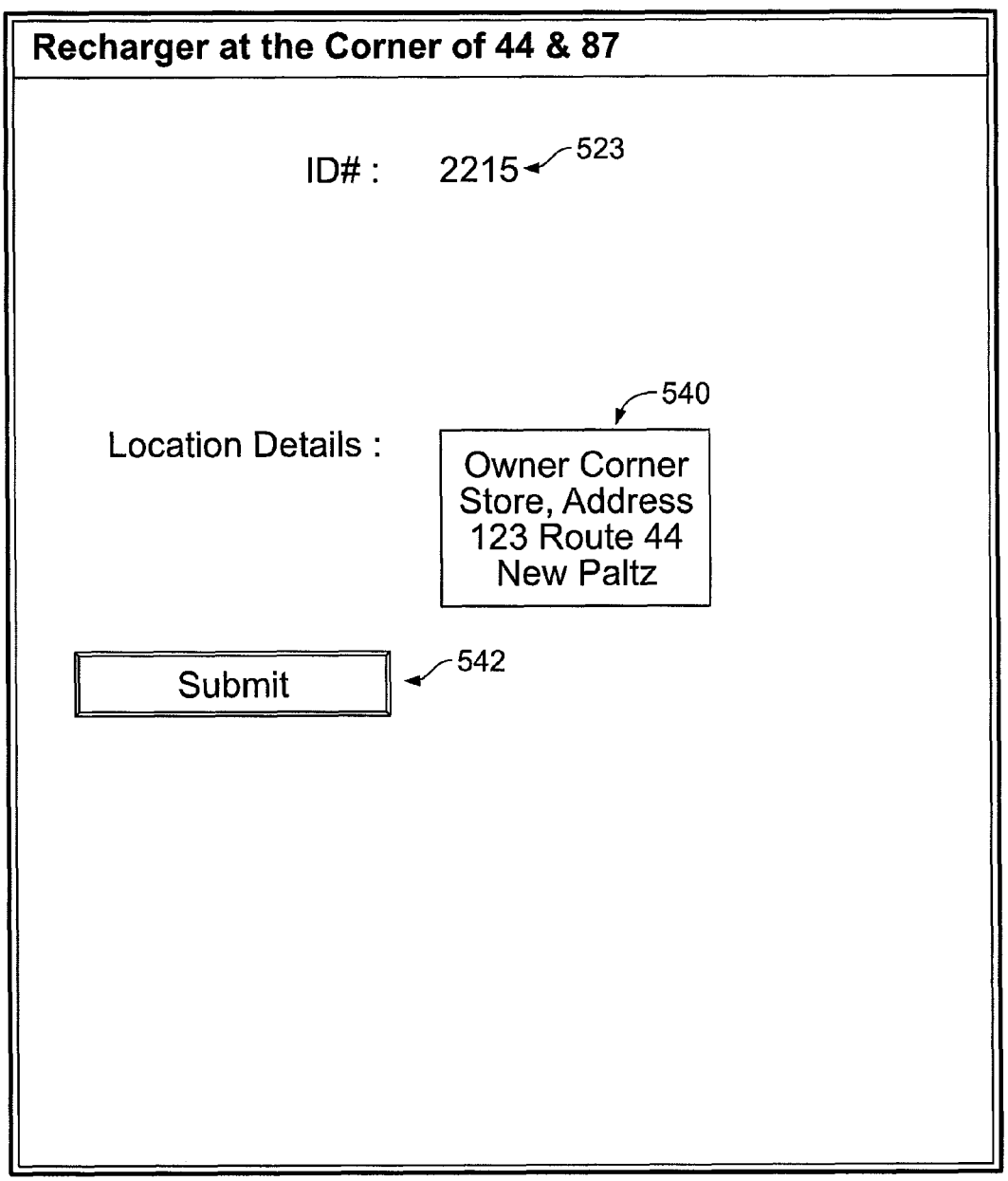
FIG. 9 shows the third GUI of the third remote device with a web page permitting input of data concerning possible participation in creating recharging station 130 of FIG. 2.

Potential lessors or land providers with a third remote device thus can review map 20, and seeing potential interest, offer a location for the recharger, for example via button 538, which can result in the web page of FIG. 9. FIG. 9 shows the third GUI of the third remote device with a web page permitting input of data concerning possible participation in creating recharging station 130 of FIG. 2. ID 523 can be provided along with a data entry box 540 for providing actual location data to the server operator via submission button 542.

Figure 10:
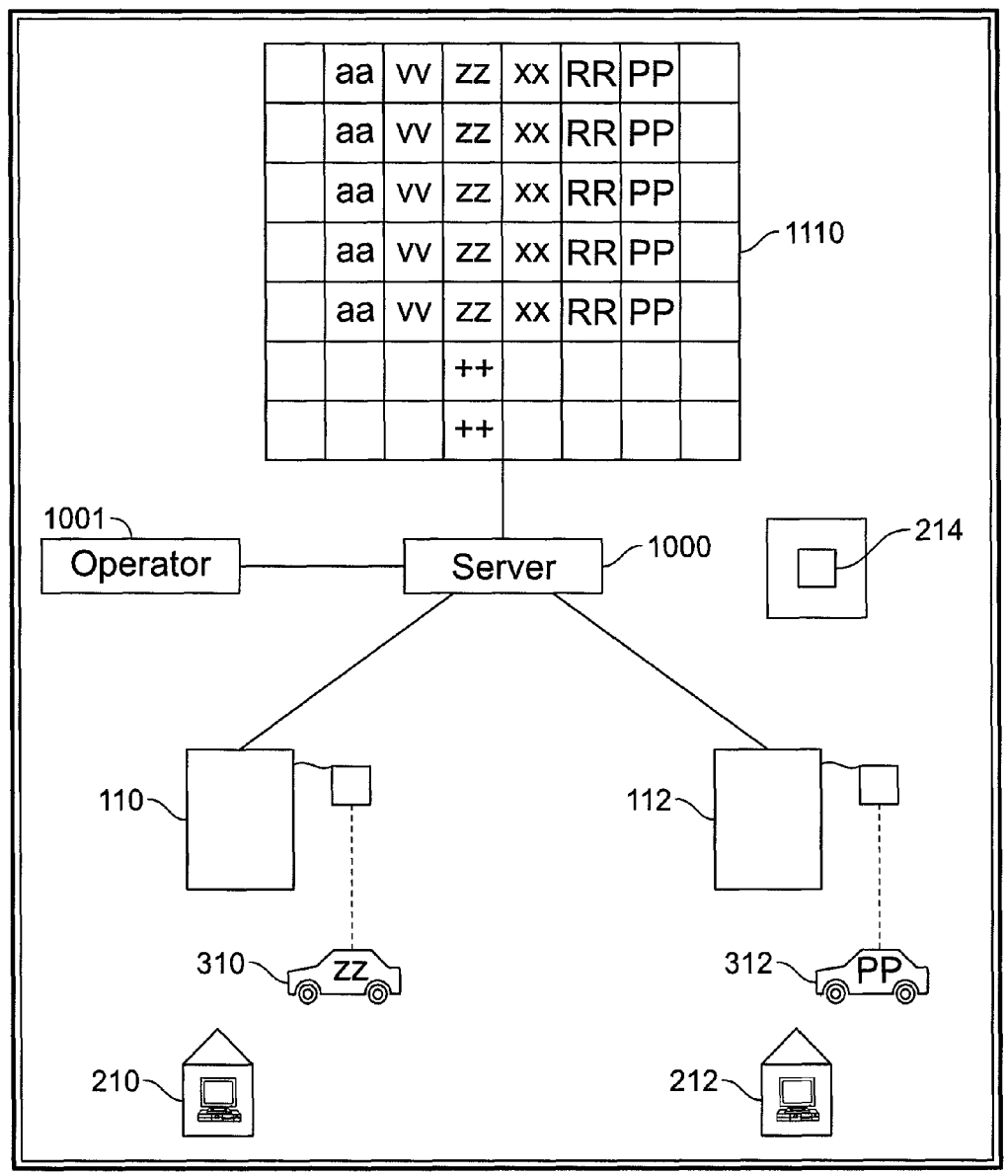
FIG. 10 shows a schematic overview of one embodiment of the system of the present invention.

FIG. 10 shows a schematic overview of one embodiment of the system of the present invention. Operator 1001 operates one or more servers 1000 interacting with remote devices 210, 212, 214. Client device 214 may be that of for example a municipality or gas station owner seeking to provide a location and possible payment for leasing or providing an electric vehicle recharging location, as described above.

Remote devices 210, 212 may be for example home computers of electric vehicle owners or future owners of electric vehicles 310, 312, respectively. These remote devices 210, 212 can be used as described above to create actual electric vehicle recharging stations 110, 112. Timetable 1110 can be used by the operator and server 1000 to control use vehicle charging, for example, by permitting only those users via for example a passcode access to recharging stations 110, 112 during certain times.

What is claimed is:

1. A method for creating an electric vehicle charging network comprising:
   receiving first location data from a first remote device;
   providing, by at least one server, electric vehicle charger data to the first remote device as a function of the first location data, the electric vehicle charger data relating to a first electric vehicle charger not yet existing;
   receiving second location data from a second remote device;
   providing, by the at least one server, the electric vehicle charger data to the second remote device as a function of the second location data;
   in response to the electric vehicle charger data, receiving interest data from the first and second remote devices to permit creation of the first electric vehicle charger, the interest data including information regarding participation in creating the first electric vehicle charger; and
   creating the first electric vehicle charger as a function of the interest data, wherein the creating the first electric vehicle charger as a function of the interest data includes determining, by the at least one server, a level of participation in creating the first electric vehicle charger from the interest data and creating the first electric vehicle charger when the interest data received by the at least one server indicates the level of participation reaches a predetermined threshold.

2. The method as recited in claim 1 wherein the interest data includes payment data.

3. The method as recited in claim 1 wherein the electric vehicle charger data includes map data, the map data including the first location data.

4. The method as recited in claim 3 wherein the map data includes a plurality of possible electric vehicle charger locations.

5. The method as recited in claim 1 wherein the electric vehicle charger data includes recharger type data for the first electric vehicle charger.

6. The method as recited in claim 1 wherein the electric vehicle charger data includes location data for the first electric vehicle charger.

7. The method as recited in claim 1 wherein the electric vehicle charger data includes price participation data for the first electric vehicle charger.

8. The method as recited in claim 1 wherein the electric vehicle charger data includes participant number data for the first electric vehicle charger.

9. The method as recited in claim 1 wherein the electric vehicle charger data includes current participant data for the first electric vehicle charger.

10. The method as recited in claim 1 wherein a user of the first remote device further provides timetable use information.

11. A method for creating an electric vehicle charging network comprising:
   receiving first location data from a first remote device;
   providing, by at least one server, possible location data for a first electric vehicle charger not yet existing as a function of the first location data;
   receiving first interest data from the first remote device in the first electric vehicle charger;
   providing, by the at least one server, the first interest data from the at least one server to a second remote device to generate further interest data in the first electric vehicle charger, the first interest data and the further interest data including information regarding commitments for creating the first electric vehicle charger; and
   creating the first electric vehicle charger when sufficient further interest data is received by the at least one server such that the commitments reach a threshold, wherein the creating the first electric vehicle charger as a function of the interest data includes determining, by the at least one server, a level of participation in creating the first electric vehicle charger from the interest data and creating the first electric vehicle charger when the interest data received by the at least one server indicates the level of participation reaches a predetermined threshold.

12. A method for creating an electric vehicle charging network comprising:
receiving first location data from a first remote device;
providing, by the at least one server, electric vehicle charger data to the first remote device as a function of the first location data, the electric vehicle charger data relating to a first electric vehicle charger not yet existing;
in response to the electric vehicle charger data, receiving interest data from the first remote device indicating interest in creating the first electric vehicle charger so as to define first interest data, the first interest data including a commitment from a user of the first remote device to invest in creating the first electric vehicle charger;
providing, by the at least one server, the first interest data to a second remote device;
in response to the first interest data, receiving, by the at least one server, second location data including actual location data for [the first electric vehicle charger; and
creating the first electric vehicle charger when sufficient interest data is received by the at least one server such that commitments to invest in creating the first electric vehicle charger reach a threshold, wherein the creating the first electric vehicle charger as a function of the interest data includes determining, by the at least one server, a level of participation in creating the first electric vehicle charger from the interest data and creating the first electric vehicle charger when the interest data received by the at least one server indicates the level of participation reaches a predetermined threshold.

13. The method as recited in claim 1 wherein the interest data includes commitments by users of the first and second remote devices to invest in the first electric vehicle charger.

14. The method as recited in claim 1 further comprising modifying electric vehicle charger data as a function of the interest data to update the electric vehicle charger data to reflect the interest data received from the first and second remote devices.

15. The method as recited in claim 1 wherein the electric vehicle charger data is provided as a web page, the method further comprising determining, by the at least one server, interest of the users of the first and second remotes devices in participating in creating the first electric vehicle charger from the interest data received from the first and second remote devices and modifying, by the at least one server, the web page to indicate the interest of the users of the first and second remotes devices in participating in creating the first electric vehicle charger.

16. The method as recited in claim 11 wherein the creating the first electric vehicle charger when sufficient further interest data is received by the at least one server such that the commitments reach a threshold includes determining, by the at least one server, a level of commitments for creating the first electric vehicle charger from the first interest data and the further interest data received by the at least one server and creating the first electric vehicle charger when the first interest data and the further interest data received by the at least one server indicates the level of commitments for creating the first electric vehicle charger reach the threshold.

17. The method as recited in claim 11 wherein the possible location data for the first electric vehicle charger is provided as a function of the first location data as a web page, the providing the first interest data to the second remote device to generate further interest data in the first electric vehicle charger including determining, by the at least one server, the user of the first remote device is committed to creating the first electric vehicle charger and modifying, by the at least one server, the web page to include the first interest data.

18. The method as recited in claim 11 wherein the creating the first electric vehicle charger when sufficient interest data is received by the at least one server such that commitments reach a threshold includes determining, by the at least one server, a level of commitments for creating the first electric vehicle charger from the first interest data and the further interest data received by the at least one server and creating the first electric vehicle charger when interest data received by the at least one server indicates the level of commitments for creating the first electric vehicle charger reach the threshold.

19. The method as recited in claim 12 wherein the electric vehicle charger data is provided to the first remote device as a function of the first location data as a web page, the providing the first interest data to the second remote device including determining, by the at least one server, the user of the first remote device is committed to investing in creating the first electric vehicle charger and modifying, by the at least one server, the web page to include the first interest data.

* * * * *